United States Patent
Dash et al.

(10) Patent No.: US 10,379,769 B2
(45) Date of Patent: Aug. 13, 2019

(54) CONTINUOUS ADAPTIVE CALIBRATION FOR FLASH MEMORY DEVICES

(71) Applicant: Western Digital Technologies, Inc., Irvine, CA (US)

(72) Inventors: Dillip K. Dash, San Diego, CA (US); Aniryudh Reddy Durgam, San Diego, CA (US); Haritha Uppalapati, San Diego, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 104 days.

(21) Appl. No.: 15/396,294

(22) Filed: Dec. 30, 2016

(65) Prior Publication Data

US 2018/0188991 A1 Jul. 5, 2018

(51) Int. Cl.
*G06F 3/06* (2006.01)

(52) U.S. Cl.
CPC .......... *G06F 3/0634* (2013.01); *G06F 3/0611* (2013.01); *G06F 3/0679* (2013.01); *G06F 3/0653* (2013.01)

(58) Field of Classification Search
CPC .... G06F 3/0634; G06F 3/0611; G06F 3/0679; G06F 3/0629; G06F 3/0653; G06F 3/0688; G06F 12/0246; G06F 2212/7206; G06F 2212/7207
See application file for complete search history.

(56) References Cited

U.S. PATENT DOCUMENTS

| | | | |
|---|---|---|---|
| 5,784,316 A * | 7/1998 | Hirata | G11C 16/10 365/185.22 |
| 6,515,909 B1 * | 2/2003 | Wooldridge | G11C 16/16 365/185.19 |
| 8,364,888 B2 | 1/2013 | Melik-Martirosian et al. | |
| 8,391,068 B2 | 3/2013 | Shelton et al. | |
| 8,745,318 B2 | 6/2014 | Rub et al. | |
| 9,082,512 B1 | 7/2015 | Davis et al. | |
| 9,329,948 B2 | 5/2016 | Li et al. | |
| 9,389,938 B2 | 7/2016 | Melik-Martirosian | |
| 2010/0149881 A1 * | 6/2010 | Lee | G11C 11/5635 365/185.33 |
| 2010/0265775 A1 * | 10/2010 | Chang | G11C 16/16 365/185.33 |
| 2012/0066439 A1 * | 3/2012 | Fillingim | G06F 11/3485 711/103 |

(Continued)

OTHER PUBLICATIONS

Wu, Guanying et al., "Reducing SSD access latency via NAND flash program and erase suspension", Retrieved Aug. 6, 2016, <http://www.sciencedirect.com/science/article/pii/S138376211300283X>.

*Primary Examiner* — Michael Krofcheck
(74) *Attorney, Agent, or Firm* — Morgan, Lewis & Bockius LLP

(57) ABSTRACT

A method for managing a flash storage system includes measuring an operation time to complete a data operation on a flash memory block of a flash memory device of the flash storage system. The method includes updating, based on the measured operation time, a running average time for the flash memory device to complete the data operation. The method includes comparing the updated running average time to a threshold time. The method includes adjusting an operating parameter for the flash memory device to perform the data operation based on the comparison.

23 Claims, 2 Drawing Sheets

(56) References Cited

U.S. PATENT DOCUMENTS

| | | | |
|---|---|---|---|
| 2012/0155187 A1* | 6/2012 | Shelton | G11C 16/16 365/185.33 |
| 2012/0239991 A1* | 9/2012 | Melik-Martirosian | G06F 11/3034 714/708 |
| 2015/0113203 A1 | 4/2015 | Dancho et al. | |
| 2016/0170672 A1 | 6/2016 | Li et al. | |
| 2016/0210050 A1* | 7/2016 | Hyun | G06F 3/0611 |
| 2018/0225236 A1* | 8/2018 | Suzuki | G06F 12/00 |

* cited by examiner

CONTINUOUS ADAPTIVE CALIBRATION FOR FLASH MEMORY DEVICES

TECHNICAL FIELD

The present disclosure concerns flash storage systems and, more particularly, continuous adaptive calibration of operating parameters for flash memory devices of the flash storage system.

BACKGROUND

Flash storage systems, such as solid-state drives (SSDs), use flash memory as a non-volatile storage medium. A flash storage system may include multiple flash memory devices. The flash memory devices are programmed (e.g., written to) as data is stored, and erased when space on the flash memory devices is freed, based on operating parameters. As the flash memory devices age, the performance characteristics of the flash memory devices change, which may require recalibration of the operating parameters. Recalibration may involve a special operation at a predetermined cycle interval.

SUMMARY

The subject technology recalibrates operating parameters of a flash storage system by maintaining a running average time for each flash memory device of the flash storage system to complete data operations. When the running average time satisfies a threshold time, the operating parameters are adjusted.

According to aspects of the subject technology, a method for managing a flash storage system is provided. The method includes measuring an operation time to complete a data operation on a flash memory block of a flash memory device of the flash storage system. The method includes updating, based on the measured operation time, a running average time for the flash memory device to complete the data operation. The method includes comparing the updated running average time to a threshold time. The method includes adjusting an operating parameter for the flash memory device to perform the data operation based on the comparison.

According to other aspects of the subject technology, a flash storage system is provided. The flash storage system includes means for measuring an operation time to complete a data operation on a flash memory block of a flash memory device of the flash storage system. The flash storage system includes means for updating, based on the measured operation time, a running average time for the flash memory device to complete the data operation. The flash storage system includes means for comparing the updated running average time to a threshold time. The flash storage system includes means for adjusting an operating parameter for the flash memory device to perform the data operation based on the comparison.

According to other aspects of the subject technology, a flash storage system is provided. The flash storage system includes a plurality flash memory devices, and a controller. The controller is configured to measure an operation time to complete a data operation on a flash memory block of a flash memory device of the flash storage system. The controller is configured to update, based on the measured operation time, a running average time for the flash memory device to complete the data operation. The controller is configured to compare the updated running average time to a threshold time. The controller is configured to adjust an operating parameter for the flash memory device to perform the data operation based on the comparison.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
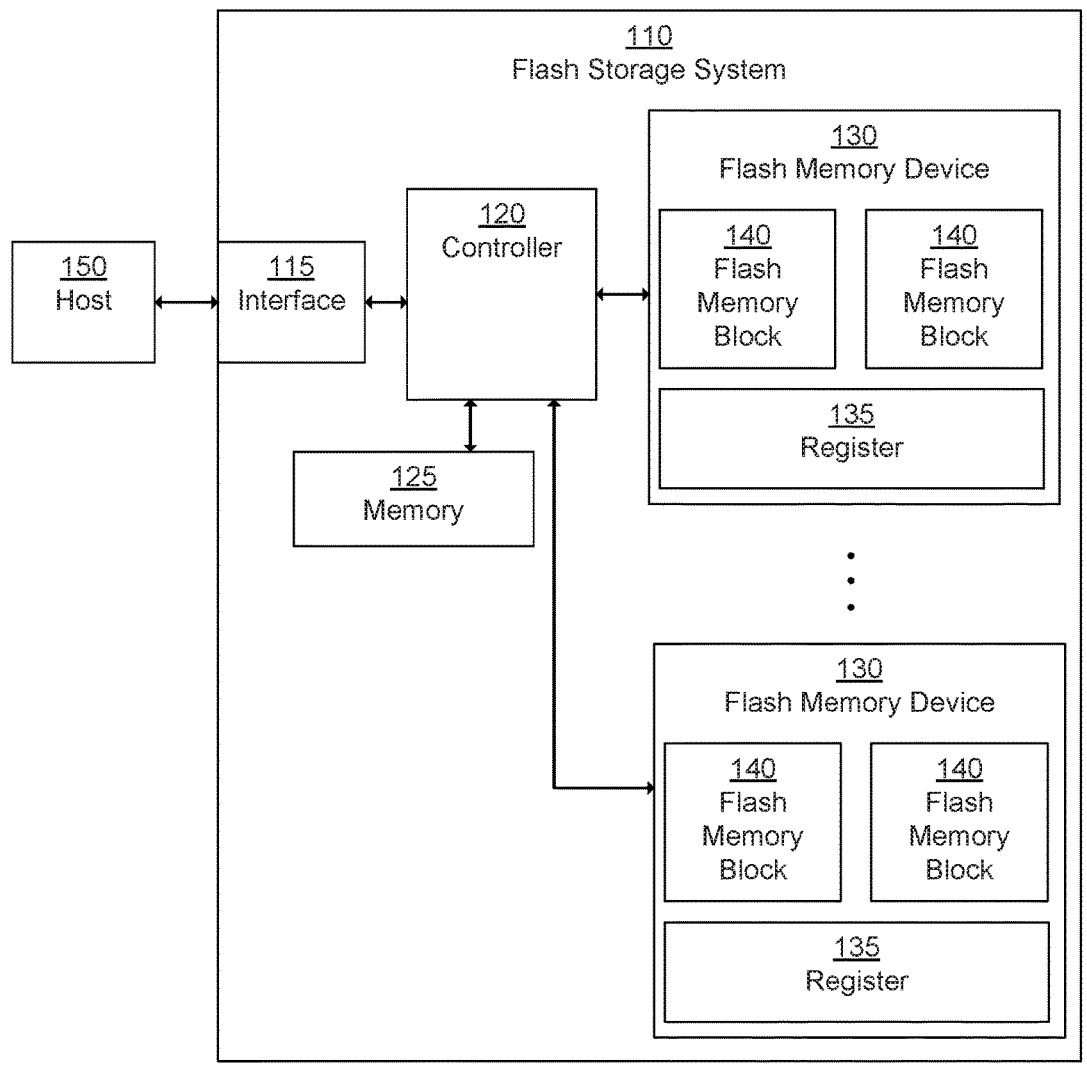
FIG. 1 is a block diagram illustrating components of a flash storage system according to aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology.

A flash storage system such as a solid-state drive (SSD) includes one or more flash memory devices or dies. Each flash memory device comprises an array of flash memory cells. Each memory cell includes a floating gate transistor that is used to store one or more bits of data. The flash memory cells may be organized into blocks, with each physical block comprising a number of pages. Data is written to flash memory in write units of pages. Data is erased from flash memory in erase units of blocks. Each program-erase (P/E) cycle may physically degrade or wear down the flash memory cells of a block such that each block has a finite number of P/E cycles before the wear deteriorates the integrity and reliability of data storage in the block.

As the flash memory devices physically degrade, the performance of the flash memory devices degrades. For example, a time to complete a write operation may increase. Therefore, operating parameters, such as write operation parameters, erase operation parameters, and read operation parameters may need to be recalibrated over time. A controller for the flash memory device may perform a recalibration operation periodically, for example at intervals of every 2000 or 5000 cycles. The recalibration operation may involve a special operation on a selected set of flash memory blocks to determine timing characteristics. The special operation may involve a number of test write and erase operations, determining average write and erase times, and adjusting the corresponding operating parameters based on the average write and erase times. However, the recalibration operation interferes with other flash storage system operations. Although a higher frequency of calibrations may be desirable for improving data operation performance, the overhead of calibration operation will negatively impact performance, and shorten a life of the flash storage system. In addition, the recalibration operation may apply the same recalibration of operating parameters across all flash memory devices. Thus, although the recalibration may average better performance for all flash memory devices, the recalibration may not be optimal for some of the flash memory devices. Moreover, the intervals may be empirically determined through lab results and therefore may not be optimal for a given flash storage system.

According to aspects of the subject technology, calibration may occur continuously, rather than at specified intervals using a special operation. A controller of a flash storage system performs a continuous adaptive calibration. The controller may measure an operation time to complete one or more data operations on a flash memory device of the flash storage system. Data operations may include read operations, write operations, and erase operations. The controller may maintain a running average time for the flash memory device to complete data operations, which may be updated after every data operation on the flash memory device. If the running average time satisfies a threshold time, the controller may recalibrate the operating parameters of the flash memory device.

FIG. 1 is a block diagram illustrating components of a flash storage system 110 according to aspects of the subject technology. As depicted in FIG. 1, the flash storage system 110 includes an interface 115, a controller 120, flash memory devices 130, and a memory 125. The interface 115 facilitates communication of data, commands, and/or control signals between the flash storage system 110 and a host 150. The controller 120 controls the operation of the flash storage system 110 to store and retrieve data in the flash memory devices 130 in accordance with commands received from the host 150. The controller 120 may include a processor. The memory 125, which may be a random access memory (RAM), provides temporary storage space for the controller 120 to process commands and transfer data between the host 150 and the flash memory devices 130. The operation of each of these components is described in more detail below.

The interface 115 provides physical and electrical connections between the host 150 and the flash storage system 110. The interface 115 is configured to facilitate communication of data, commands, and/or control signals between the host 150 and the flash storage system 110 via the physical and electrical connections. The connection and the communications with the interface 115 may be based on a standard interface such as Universal Serial Bus (USB), Small Computer System Interface (SCSI), Serial Advanced Technology Attachment (SATA), etc. Alternatively, the connection and/or communications may be based on a proprietary interface, although the subject technology is not limited to any particular type of interface.

The host 150 may be a computing device, such as a computer/server, a smartphone, or any other electronic device that reads data from and writes data to the flash storage system 110. The host 150 may have an operating system or other software that issues read and write commands to the flash storage system 110. The flash storage system 110 may be integrated with the host 150 or may be external to the host 150. The flash storage system 110 may be wirelessly connected to the host 150, or may be physically connected to the host 150.

FIG. 1 shows two flash memory devices 130. However, the flash storage system 110 may include more than two flash memory devices 130 and is not limited to two flash memory devices 130. The flash memory devices 130 may each be a single flash memory chip or die. The flash memory devices 130 may be organized among multiple channels through which data is read from and written to the flash memory devices 130 by the controller 120, or coupled to a single channel. In addition, each channel may have its own controller or microcontroller, which may be integrated with or separate from the controller 120. The flash memory devices 130 may be implemented using NAND flash memory. The flash memory devices 130 may each comprise a register 135, which may be one or more registers for storing data, such as operating parameters of the respective flash memory devices 130. The operating parameters may include: write operation parameters such as initial pulse value, incremental pulse value, and pulse width; erase operation parameters such as initial pulse value, incremental pulse value, and pulse width; and read operation parameters such as read level voltage.

The flash memory devices 130 comprise multiple memory cells distributed into storage blocks such as flash memory blocks 140. Although FIG. 1 shows the flash memory devices 130 each having two flash memory blocks 140, the flash memory devices 130 may have more or less flash memory blocks 140, and the flash memory devices 130 may each have the same or different numbers of flash memory blocks 140. The flash memory blocks 140 may be referred to as data blocks or memory blocks and are addressable by the controller 120 using a physical block address. Each of the flash memory blocks 140 is further divided into multiple data segments or pages addressable by the controller 120 using a physical page address or offset from a physical block address of the storage block containing the referenced page. The pages may store sectors or other host data units. The flash memory blocks 140 represent the units of data that are erased within the flash memory devices 130 in a single erase operation. The pages represent the units of data that are read from or written to the flash memory devices 130 in a read or write operation. Although the flash memory devices 130 are described in terms of blocks and pages, other terminology may be used to refer to these data units within a flash storage device.

The subject technology is not limited to any particular capacity of flash memory. For example, storage blocks may each comprise 32, 64, 128, or 512 pages, or any other number of pages. Additionally, pages may each comprise 512 bytes, 2 KB, 4 KB, or 32 KB, for example. The sectors may each comprise, for example, 512 bytes, 4 KB, or other sizes. There may be one or more sectors per page.

In FIG. 1, the memory 125 represents a volatile memory coupled to and used by the controller 120 during operation of the flash storage system 110. The controller 120 may buffer commands and/or data in the memory 125. The controller 120 also may use the memory 125 to store address mapping tables or lookup tables used to convert logical data addresses used by the host 150 into virtual and/or physical addresses corresponding to portions of the flash memory devices 130. Other types of tables, data, status indicators, running average times, threshold values, etc. used to manage the flash memory devices 130 may also be stored in the memory 125 by the controller 120. For example, characteristics of the flash memory devices 130 include data used for wear leveling, such as P/E cycle counts for each flash memory block 140, error counts for each flash memory block 140, and retention times for each flash memory block 140. The memory 125 may be implemented using dynamic random access memory (DRAM), static random access memory (SRAM), or other types of volatile random access memory without departing from the scope of the subject technology. The controller 120 may periodically store the contents of the memory 125 into one or more designated flash memory blocks 140, such as before the flash storage system 110 is powered down.

The controller 120 manages the flow of data between the host 150 and the flash memory devices 130. The controller 120 is configured to receive commands and data from the host 150 via the interface 115. For example, the controller 120 may receive data and a write command from the host 150 to write the data in the flash memory devices 130. The controller 120 is further configured to send data to the host 150 via the interface 115. For example, the controller 120 may read data from the flash memory devices 130 and send the data to the host 150 in response to a read command. The controller 120 is further configured to manage data stored in the flash memory devices 130 and the memory 125 based on internal control algorithms or other types of commands that may be received from the host 150. For example, the controller 120 is configured to perform operations such as garbage collection (GC), error correction, and wear leveling. Those skilled in the art will be familiar with other operations performed by a controller in a flash storage device, which will not be described in detail herein.

The controller 120 may be implemented with a general purpose processor, microcontroller, digital signal processor (DSP), a system-on-a-chip (SoC), an application specific integrated circuit (ASIC), a field programmable gate array (FPGA) or other programmable logic device, discrete gate or transistor logic device, discrete hardware components, or any combination thereof designed and configured to perform the operations and functions described herein. The controller 120 may perform the operations and functions described herein by executing one or more sequences of instructions stored on a machine/computer readable medium. The machine/computer readable medium may be the flash memory devices 130, the memory 125, or other types of media from which the controller 120 can read instructions or code. For example, flash storage system 110 may include a read only memory (ROM), such as an EPROM or EEPROM, encoded with firmware/software comprising one or more sequences of instructions read and executed by the controller 120 during the operation of the flash storage system 110.

Figures 2, 3:
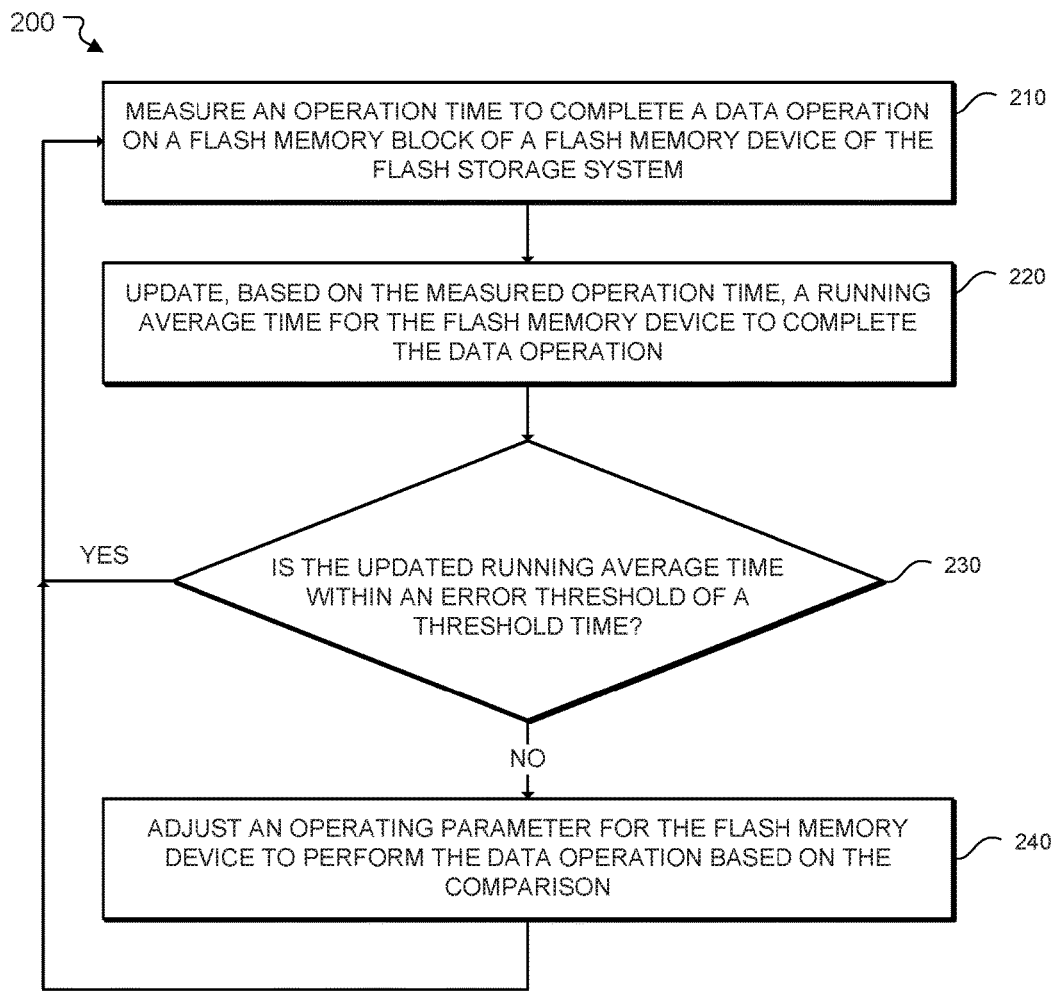
FIG. 2 is a flowchart illustrating a method for managing a flash storage system according to aspects of the subject technology.
FIG. 3 is a table showing calibration data managed by the flash storage system according to aspects of the subject technology.

FIG. 2 shows a flowchart 200 for continuous adaptive calibration according to aspects of the subject technology. The process in FIG. 2 may be performed, for example, by the controller 120 of the flash storage system 110. With respect to the flash memory device 130, the register 135 of flash memory device 130 may store the operating parameters for the flash memory device 130. The operating parameters may be applied to operations performed on all of the flash memory blocks 140 of the flash memory device 130. In certain implementations, there may be more than one set of operating parameters. For example, different flash memory blocks 140 may use different sets of operating parameters. Each individual flash memory block 140 may have its own set of operating parameters. Alternatively, groups of flash memory blocks 140, which may be identified by addresses or physical location on the flash memory device 130, may have their own sets of operating parameters.

At 210, the controller 120 measures an operation time to complete a data operation on a flash memory block 140 of a flash memory device 130. The data operation may be a read operation, a write operation, or an erase operation. The controller 120 may measure the data operation through a scan operation, which involves sending beacons to the flash memory device 130.

FIG. 3 shows an example table 300 of calibration data that may be managed by the controller. The table is conceptual in that the calibration data may be stored in separate registers 135 or the memory 125, and may not be stored as a table. The calibration data may be stored in other formats. For example, the values may be stored in different units, or may be stored as flags. The table 300 corresponds to a single flash memory device, which may be identified by an identifier such as an address. The controller 120 may manage data for all flash memory devices 130 such that there may be a table for each flash memory device 130. In certain implementations, the controller 120 may manage calibration data for one or more flash memory blocks 140. In addition, although the table 300 shows two data operations, write and erase, the controller 120 may manage data for other operations, such as read operations.

Returning to 210, the controller 120 issues the data operation to the flash memory device 130. Then, the controller 120 starts the scan operation by setting a beacon counter to zero. The beacons may be sent at periodic intervals at a beacon frequency. The beacon frequency may be stored in the memory 125 or the register 135 and may correspond to a time, such as 1 μs. Each time a beacon is sent, the controller 120 increments the beacon counter. The flash memory device 130 returns an indication in response to a beacon when the data operation is complete. For example, FIG. 3 shows that for a write operation, 2000 beacons were sent before the write operation completed. FIG. 3 shows another example, an erase operation, in which 7000 beacons were sent before the erase operation completed.

Based on a number of beacons sent before the indication, and the beacon frequency, the operation time may be determined without requiring additional hardware for timing the data operation. In FIG. 3, using a beacon frequency of 1 μs, the write operation took 2000 μs (2 ms) to complete, and the erase operation took 7000 μs (7 ms) to complete.

Alternatively, rather than sending a beacon and receiving a response, the controller 120 may check the register 135 of the flash memory device 130, at the beacon frequency, for a complete flag set by the flash memory device 130 upon completion of the data operation. In yet other alternatives, the flash storage system 110 may include timing hardware for timing the data operation, for example by tracking start and end times for the data operation. The timing hardware may check the register 135 for the complete flag, or the flash memory device 130 may send an indication to the timing hardware when the data operation is complete.

At 220, the controller 120 updates, based on the measured operation time, a running average time for the flash memory device 130 to complete the data operation. The controller 120 may retrieve the running average time for the flash memory device 130, update the running average time with the operation time, and store the updated running average time. For example, in FIG. 3, the updated running average time for write operations is 2.1 milliseconds and the updated running average time for erase operations is 5.0 milliseconds.

The running average time may be limited to a window of the last n cycles, such as 100, such that the running average time is an average of the last n operation times. There may be a running average time for each type of operation, such as a running average time for write operations, a running average time for erase operations, and a running average time for read operations. Alternatively, there may be a running average time for all data operations. The running average time may track data operations for all flash memory blocks 140 of the flash memory device 130. Alternatively, there may be a running average time for each flash memory block 140, or for groups of flash memory blocks 140. For example, the flash memory blocks 140 may be grouped by addresses or physical location, such as edges, on the flash memory device 130. For example, the first x flash memory blocks may be grouped together, the next y flash memory blocks may be grouped together, etc.

In certain implementations, the microcontroller of each channel for each flash memory device 130 may maintain the running average time, and may further update the running average time. In alternative implementations, the flash storage system 110 may include dedicated hardware for updating and maintaining the running average times of the flash memory devices 130.

At 230, the controller 120 compares the updated running average time to a threshold time. For example, the controller 120 may determine a difference between the running average time to the threshold time. The threshold time may be a time, such as 2.2 ms for a write operation or 5.1 ms for an erase operation as seen in FIG. 3, corresponding to a desired performance. The threshold time may be static through the life of the flash storage system 110, or may vary over the life. There may be threshold times for each of the flash memory devices 130. Alternatively, there may be threshold times for flash memory blocks 140.

The controller 120 may compare the difference to an error threshold, which may be, for example, 0.1 ms (100 µs) for write operations and 0.2 ms (200 µs) for erase operations, as seen in FIG. 3. The error threshold may be a constant value, or may change over the life of the flash storage system 110. For example, the error threshold may change based on P/E cycle counts for the flash memory devices 130, and/or looked up from a table of error threshold values. There may be a single error threshold for the flash storage system 110, and/or an error threshold for each flash memory device 130, and/or an error threshold for one or more flash memory blocks 140. In addition, there may be an error threshold for each type of data operation, as seen in FIG. 3.

If the difference satisfies the error threshold, the process returns to 210 to measure the next data operation. For example, for the erase operation in FIG. 3, the average running time of 5.0 ms differs from the threshold time by 0.1 ms, which is less than the error threshold of 0.2 ms. The erase operating parameters may not require recalibration. Therefore, recalibration may not occur after every data operation. If the difference does not satisfy the error threshold, the controller 120 may recalibrate the flash memory device 130 by adjusting an associated operating parameter. For example, for the write operation in FIG. 3, the average running time of 2.4 ms differs from the threshold time by 0.2 ms, which is greater than the error threshold of 0.1 ms. The write operating parameters may require recalibration.

At 240, the controller 120 adjusts, based on the comparison, one or more operating parameters for the flash memory device 130 to perform the data operation. The operation parameter may be adjusted so that the operation time is within the error threshold of the threshold time. For example, if the data operation is a write operation, the controller 120 may adjust one or more of an initial pulse value, incremental pulse value, and pulse width. Magnitudes of the initial pulse value and incremental pulse value may be increased to decrease the operation time, and decreased to increase the operation time. Magnitude of the pulse width may be increased to increase the operation time, and decreased to decrease the operation time. Similar adjustments may be made for erase operations. The controller 120 may adjust the operating parameter by a preset amount, which may be looked up in a table, or may adjust in proportion to the difference, which may be looked up in a table or determined based on a formula.

Because the running average times are updated after each data operation is completed, and the operating parameters may be adjusted when the running average time does not satisfy the error threshold, the recalibration is continuous. In other words, recalibration may not require waiting for the controller 120 to perform the special operation. Thus, aspects of the subject technology provide continuous, adaptive calibration without injecting special operations that interfere with other operations.

Moreover, the flash memory devices 130 may perform differently, and each may require different calibration. In addition, the flash memory blocks 140 of a given flash memory device 130 may each require different calibration. By maintaining increasingly granular running average times, the controller 120 may apply increasingly granular calibration, rather than applying a single calibration across all flash memory blocks 140.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for managing a flash storage system, comprising:
   in response to a start of a data operation on a flash memory block of a flash memory device among a plurality of flash memory devices of the flash storage system, periodically sending a beacon at a regular interval to the flash memory device at a beacon frequency;
   determining whether the data operation is completed; and
   in response to determining that the data operation is completed:
      determining, based on the beacon frequency and a number of beacons sent, an operation time for the data operation to complete on the flash memory block of the flash memory device among the plurality of flash memory devices of the flash storage system;
      updating, based on the operation time, a running average time for the flash memory device to complete the data operation;
      comparing the updated running average time to a threshold time; and
      adjusting a plurality of operating parameters for the flash memory device based on the comparison.

2. The method of claim 1, wherein determining whether the data operation is completed further comprises:
   receiving, from the flash memory device, in response to the beacon, an indication that the data operation is completed.

3. The method of claim 1, wherein comparing the updated running average time to the threshold time further comprises:
   determining a difference between the updated running average time and the threshold time.

4. The method of claim 3, wherein adjusting the plurality of operating parameters further comprises:
   determining whether the difference satisfies an error threshold; and
   when the difference does not satisfy the error threshold, adjusting the plurality of operating parameters for the flash memory device.

5. The method of claim 1, wherein the running average time corresponds to a plurality of flash memory blocks of the flash memory device.

6. The method of claim 5, wherein adjusting the plurality of operating parameters further comprises adjusting an operating parameter for a subset of the plurality of flash memory blocks to perform the data operation.

7. The method of claim 1, wherein the running average time is based on a predetermined number of cycles.

8. The method of claim 1, wherein the data operation is a program operation.

9. The method of claim 1, wherein the data operation is an erase operation.

10. A flash storage system, comprising:
    means for in response to a start of a data operation on a flash memory block of a flash memory device of the flash storage system, periodically sending a beacon at a regular interval to the flash memory device at a beacon frequency;
    means for determining whether the data operation is completed; and
    in response to determining that the data operation is completed:
       means for determining an operation time for the data operation to complete on the flash memory block of the flash memory device of the flash storage system;
       means for updating, based on the operation time, a running average time for the flash memory device to complete the data operation;
       means for comparing the updated running average time to a threshold time; and
       means for adjusting a plurality of operating parameters for the flash memory device based on the comparison.

11. The flash storage system of claim 10, wherein the means for determining whether the data operation is completed further comprises:
    means for receiving, from the flash memory device, in response to the beacon, an indication that the data operation is completed.

12. The flash storage system of claim 10, wherein the means for comparing the updated running average time to the threshold time further comprises:
    means for determining a difference between the updated running average time and the threshold time.

13. The flash storage system of claim 12, wherein the means for adjusting the plurality of operating parameters further comprises:
    means for determining whether the difference satisfies an error threshold; and
    means for adjusting, when the difference does not satisfy the error threshold, the plurality of operating parameters for the flash memory device.

14. The flash storage system of claim 10, wherein the running average time corresponds to a plurality of flash memory blocks of the flash memory device.

15. The flash storage system of claim 14, wherein the means for adjusting the plurality of operating parameters further comprises means for adjusting an operating parameter for a subset of the plurality of flash memory blocks to perform the data operation.

16. The flash storage system of claim 10, wherein the running average time is based on a predetermined number of cycles.

17. A flash storage system, comprising:
a plurality flash memory devices; and
a controller configured to:
in response to a start of a data operation on a flash memory block of a flash memory device among a plurality of flash memory devices of the flash storage system, periodically send a beacon at a regular interval to the flash memory device at a beacon frequency;
determine whether the data operation is completed; and
when the data operation is completed,
determine, based on the beacon frequency and a number of beacons sent, an operation time for the data operation to complete on the flash memory block of the flash memory device among the plurality of flash memory devices of the flash storage system;
update, based on the operation time, a running average time for the flash memory device to complete the data operation;
compare the updated running average time to a threshold time; and
adjust a plurality of operating parameters for the flash memory device based on the comparison.

18. The flash storage system of claim 17, wherein the controller is configured to:
receive, from the flash memory device, in response to the beacon, an indication that the data operation is completed.

19. The flash storage system of claim 17, wherein the controller is configured to:
determine a difference between the updated running average time and the threshold time.

20. The flash storage system of claim 19, wherein the controller is configured to:
determine whether the difference satisfies an error threshold; and
when the difference does not satisfy the error threshold, adjust the plurality of operating parameters for the flash memory device.

21. The flash storage system of claim 17, wherein the running average time corresponds to a plurality of flash memory blocks of the flash memory device.

22. The flash storage system of claim 21, wherein the controller is configured to:
adjust an operating parameter of the plurality of operating parameters for a subset of the plurality of flash memory blocks to perform the data operation.

23. The flash storage system of claim 17, wherein the running average time is based on a predetermined number of cycles.

* * * * *